United States Patent
Capek et al.

(10) Patent No.: US 7,343,312 B2
(45) Date of Patent: Mar. 11, 2008

(54) EVENT SCHEDULING WITH OPTIMIZATION

(75) Inventors: Peter George Capek, Ossining, NY (US); William Grey, Millwood, NY (US); Paul Andrew Moskowitz, Yorktown Heights, NY (US); Clifford A. Pickover, Yorktown Heights, NY (US); Dailun Shi, Croton on Hudson, NY (US)

(73) Assignee: International Business Machines Corporation, Armonk, NY (US)

( * ) Notice: Subject to any disclaimer, the term of this patent is extended or adjusted under 35 U.S.C. 154(b) by 1147 days.

(21) Appl. No.: 10/133,721

(22) Filed: Apr. 25, 2002

(65) Prior Publication Data

US 2003/0204474 A1 Oct. 30, 2003

(51) Int. Cl.
*G06F 9/46* (2006.01)

(52) U.S. Cl. .................................. 705/8; 705/9; 705/1
(58) Field of Classification Search .................... 705/8, 705/1, 9
See application file for complete search history.

(56) References Cited

U.S. PATENT DOCUMENTS

| | | | | |
|---|---|---|---|---|
| 5,050,077 A * | 9/1991 | Vincent | .......................... | 705/8 |
| 5,124,912 A * | 6/1992 | Hotaling et al. | ................ | 705/9 |
| 5,197,000 A * | 3/1993 | Vincent | .......................... | 705/8 |
| 5,323,314 A * | 6/1994 | Baber et al. | ..................... | 705/8 |
| 5,615,121 A * | 3/1997 | Babayev et al. | ................ | 705/9 |
| 5,848,395 A * | 12/1998 | Edgar et al. | ..................... | 705/9 |
| 5,867,822 A * | 2/1999 | Sankar | .......................... | 705/8 |
| 5,943,652 A | 8/1999 | Sisley et al. | .................... | 705/9 |
| 6,035,278 A | 3/2000 | Mansour | ......................... | 705/9 |
| 6,101,480 A * | 8/2000 | Conmy et al. | ................... | 705/9 |
| 6,104,788 A | 8/2000 | Shaffer et al. | ............ | 379/93.17 |
| 7,027,994 B2 * | 4/2006 | Verdi et al. | ..................... | 705/7 |
| 2006/0010023 A1 * | 1/2006 | Tromczynski et al. | .......... | 705/8 |

OTHER PUBLICATIONS

"IBM-Lotus: Calendaring is on the agenda", Computer Reseller News, Dec. 1996.*
"An agent oriented schedule management system: IntelliDiary" by Wada et al, Multimedia System Laboratory white paper, 1996.*
"Scheduling resources in multi-user, heterogeneous, computing environments with SmartNet" by Freund et al, IEEE, 1998.*
"Privacy/efficiency tradeoffs in distributed meeting scheduling by constraint-based agents" by Freuder et al, Proceedings of IJCAI DCR, 2001.*

(Continued)

*Primary Examiner*—Tariq R. Hafiz
*Assistant Examiner*—Johnna Loftis
(74) *Attorney, Agent, or Firm*—Duke W. Yee; Stephen C. Kaufman; Theodore D. Fay, III

(57) ABSTRACT

The present invention is a method for scheduling an event or meeting consisting of a plurality of persons which is determined by optimizing one or more variables. In the preferred embodiment, one or more requests for a meeting are pooled. A selected variable is optimized and an event is scheduled on the optimized variable. As additional meeting requests are pooled which conflict with the initial optimized event, the selected variable is again optimized and the event is dynamically rescheduled based on the optimized variable.

1 Claim, 3 Drawing Sheets

OTHER PUBLICATIONS

"Mobile agents and their use for information retrieval: a brief overview and an elaborate case study" by Glitho et al, IEEE, Jan./Feb. 2002.*

"Remote agent: to boldly go where no AI system has gone before" by Muscettola et al, Artificial Intelligence, 1998.*

"Special Edition Using Microsoft Outlook 2000" by Padwick et al, Que Publisher, May 12, 1999.*

"Special Edition Using Lotus Notes and Domino 5", Que Publisher, Aug. 23, 1999.*

"Stochastic Programming Problems with Probability and Quantile Functions" by Kibzun et al, Wiley Publishing, Jan. 1996.*

* cited by examiner

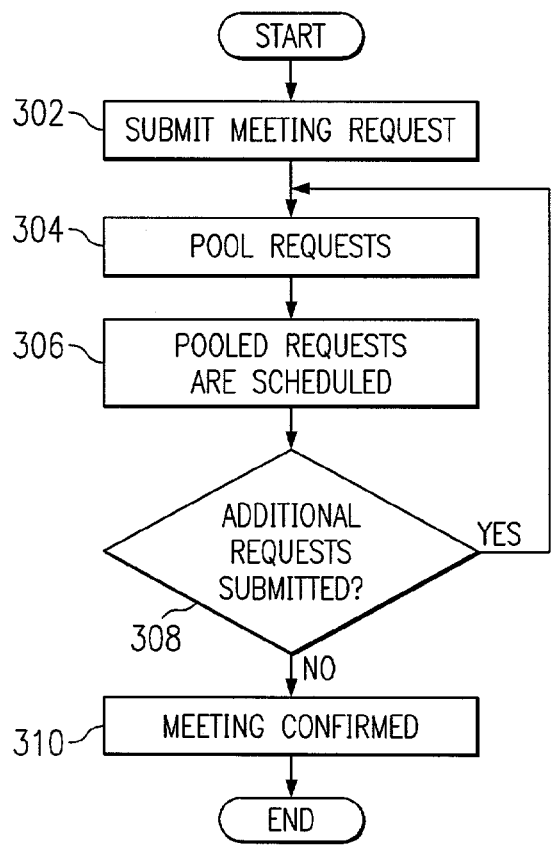
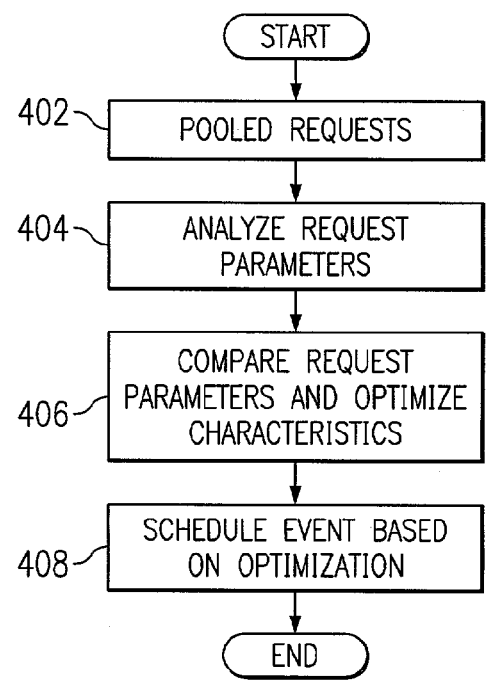

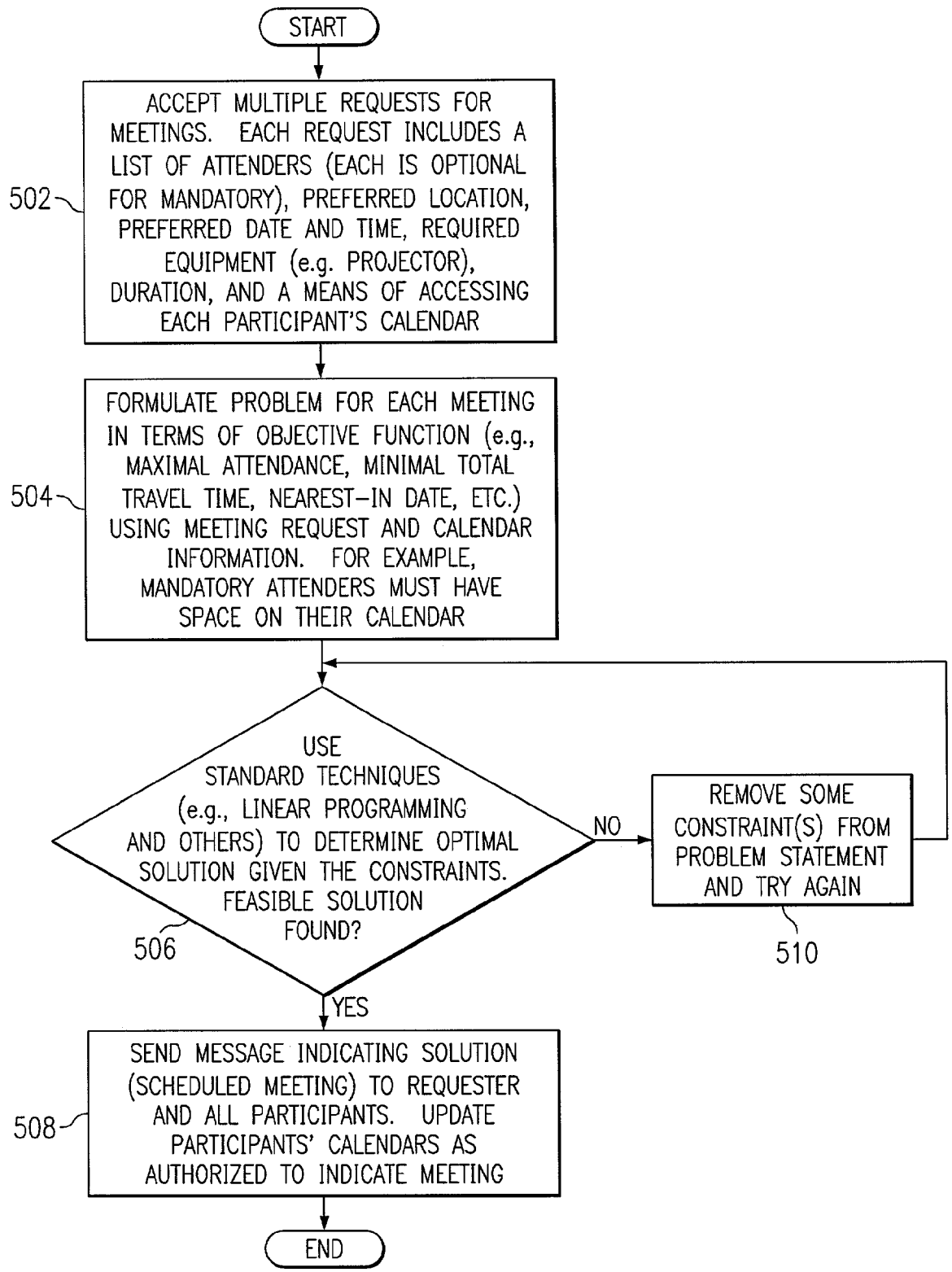

EVENT SCHEDULING WITH OPTIMIZATION

BACKGROUND OF THE INVENTION

1. Technical Field

The present invention relates to scheduling management, and, more particularly, to a system and method for optimizing the scheduling of calendar meeting events.

2. Description of Related Art

Scheduling events for which a plurality of personnel are required to attend is quite difficult in today's fast paced work environment. Due to the increasing pace of information transfer and conduct of business, scheduling an acceptable time and location for a plurality of people to conduct a meeting typically involves accounting for many different variables that may affect a person's ability to travel and meet at the specified location at the specified meeting time. These variables include travel schedules, working periods, convenience of meeting locations and, of course, other commitments. As a result, calendar meetings are often rescheduled at least once, if not several times, before the meeting is conducted.

Scheduling planning routines and methods are known in the art. Computer programs for scheduling meetings are available that allow users to schedule meetings based on electronic calendars stored for office employees. The program maintains a schedule for each individual, and provides schedule information to users who are planning meetings. For example, U.S. Pat. No. 5,093,813 discloses an electronic scheduler that allows a caller using a telephone to remotely make appointments. The electronic scheduler can automatically select an appointment time for the caller to meet with a single individual, such as a doctor. However, the scheduler cannot select a common meeting time for the caller and a plurality of other attendees. This drawback limits the usefulness of the scheduler in an office environment. Likewise, no provision is made for a plurality of persons requesting a meeting to schedule that meeting based on selected variables such as time, length, or location which are then optimized to produce the most convenient meeting for all persons requesting the meeting.

Accordingly, a need exists for a method of scheduling events among a plurality of persons by optimizing a selected variable or variables to establish a convenient time for the occurrence of an event. Further, a need exists for a method of dynamically scheduling an event among a plurality of persons based on at least one optimized variable. The terms event, meeting, and calendar meeting are interrupted as having similar meanings for the purposes of the invention herein.

SUMMARY OF THE INVENTION

The present invention is a method for scheduling an event or meeting consisting of a plurality of persons which is determined by optimizing one or more variables. In the preferred embodiment, one or more requests for a meeting are pooled. A selected variable(s) is optimized and an event is scheduled on the optimized variable. As additional meeting requests are pooled which conflict with the initial optimized event, the selected variable(s) is again optimized and the event is dynamically rescheduled based on the optimized variable.

BRIEF DESCRIPTION OF THE DRAWINGS

The novel features believed characteristic of the invention are set forth in the appended claims. The invention itself, however, as well as a preferred mode of use, further objectives and advantages thereof, will best be understood by reference to the following detailed description of an illustrative embodiment when read in conjunction with the accompanying drawings, wherein:

FIG. 3 is a detailed block diagram illustrating the scheduling method disclosed herein; and, FIG. 4 illustrates a flow diagram of a method of optimizing pooled meeting requests as disclosed herein; and, FIG. 5 is a flow diagram illustrating an alternative embodiment of the method disclosed herein.

DETAILED DESCRIPTION OF THE PREFERRED EMBODIMENT

Figures 1, 2:
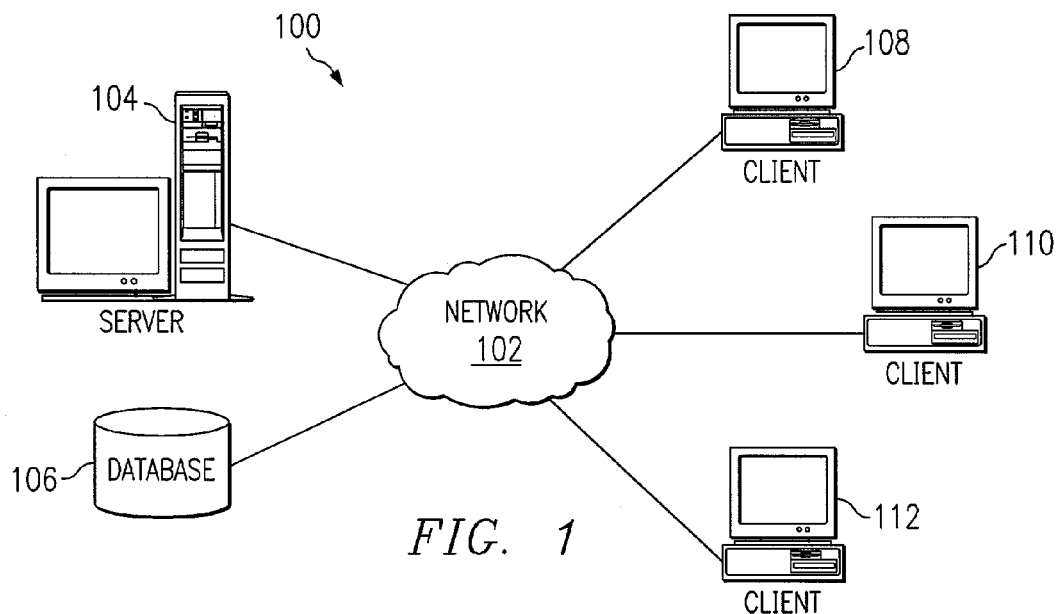
FIG. 1 is a diagram of a network in which the present invention may be implemented.
FIG. 2 depicts a user display page showing an interface which might be presented to a user for the purpose of requesting the scheduling of a meeting.

Turning to FIG. 1, a network diagram in which the present invention may be implemented is shown. FIG. 1 is a pictorial representation of a distributed data processing system. Distributed data processing system 100 contains a network 102, which is the medium used to provide communications links between various devices and computers connected together within distributed data processing system 100. Network 102 may include permanent connections, such as wire or fiber optic cables, or temporary connections made through telephone connections.

In the depicted example, a scheduler 104 and database 106 are connected to network 102. The scheduler 104 is a software application as is known in the art which provides the client(s) 108, 110, 112, which are also identified herein as "attendees" and "requesters", with multiple functions such as an e-mail, calendar, date book, and task manager. Scheduler 104 may be located on a corporate server, personal computer or be a third party service providing scheduling services to clients 108, 110, 112. Clients 108, 110, 112 may be, for example, personal computers, network computers, wireless phones or personal digital devices with access to private and public networks with more than one individual client. For purposes of this application, a network computer is any computer coupled to the network 102. Distributed data processing system 100 may also include additional servers, clients, and other devices not shown. The invention may be easily implemented by one skilled in the art using known programming techniques and equipment.

In the depicted example, distributed data processing system 100 is the Internet, with network 102 representing a worldwide collection of networks and gateways that use the TCP/IP suite of protocols to communicate with one another. At the heart of the Internet is a backbone of high-speed data communication lines between major nodes or host computers, consisting of thousands of commercial, government, education, and other computer systems that route data and messages. Of course, distributed data processing system 100 also may be implemented as a number of different types of networks, such as, for example, an intranet, a local area network (LAN), or a wide area network (WAN). FIG. 1 is intended as an example and not as an architectural limitation for the present invention. For example, the basis for implementation might be a private network within a company, at one location or several, which may or may not be connected to the public Internet. Furthermore, the basis may be a shared ("timeshared") computing system which interacts with individual users through the use of terminals or computers.

FIG. 2 shows an example of a client software interface 200 which provides an electronic input mechanism for a user to input information variables for the purpose of requesting the scheduling of a meeting. The information input by the client constitutes a variable which is optimized according to the preferences input by the client. For example, FIG. 2 depicts the specification of meeting participants either by name, group, department or by some other description, and the specification of alternate attendees (e.g. Fred Barnes or Larry Jacobs) 202. For each attendee, the interface 200 allows specification as to whether the attendance of that person is mandatory, desirable, or optional and also allows specification that the participation of an attendee by alternative electronic means, such as a telephone, is acceptable 204. In the latter case, the corresponding person's location or travel time would not be included in any scheduling optimization, but his availability (according to the mandatory/desirable/optional setting) would be included in the optimization. Note that the words attendee and participant are used in the same sense. A person may be an attendee or participant without being physically present at a meeting or event. For example, a person may participate or attend by means of a phone or computer network.

The interface 200 allows an attendee to specify an earliest and/or latest date for the meeting to take place, as well as an ideal target date for the meeting to occur 206. The interface allows any or all of these variables to be included or omitted in the determination of an optimized meeting. A preferred time 208 may also be specified, as may a preferred or mandatory location 210. Finally, a meeting topic or title may be included to identify the context in which the meeting will be conducted 214. When a condition (place, date, time, person's participation) is mandatory, it participates as a mandatory constraint in establishing the list of possible meeting arrangements, but does not normally participate in the optimization, since there is no opportunity to change the value of that variable. In other words, the system described can operate in a somewhat "degenerate" mode where no true optimization is performed, but a meeting is scheduled at a possible date, time and place. Alternatively, an attendee may mark a scheduled meeting as either flexible or not. An event which is flexible is one that may be dynamically rescheduled if, for instance, the event is marked flexible by all of the other attendee's calendars and it can be rescheduled while still honoring the original meeting request constraints. In contrast, meetings denoted as inflexible are not capable of being dynamically rescheduled as contemplated by the invention set forth herein. As a result, a meeting marked as inflexible will occur at the specified time and place regardless of whether or not all attendees are capable of being present at the meeting.

With reference to FIG. 3, a flow diagram of the method disclosed herein is shown. Initially, it is noted that the specific formulation of an optimization problem for scheduling a meeting request will depend on the specific collection of variables input by the client in that meeting request as set forth in FIG. 2. For instance, a meeting request which specifies a specific target date tries to minimize the amount of time (hours, days) away from that target that the meeting is scheduled. A meeting which has optional participants tries to maximize (within the other constraints) the number of participants who can attend. All optimizations of meeting requests try to minimize the total distance traveled by participants who attend physically. Requests which have more than one of these constraints try to minimize a combination of variables, such as the sum of minutes away from target date and total number of feet to be walked, or miles to be driven, to attend the meeting. In this example, clients submit meeting requests to the scheduler for a particular list of attendees, and possibly also specifying a preferred date, time and location (Step 302). The scheduler is also given access, by an appropriate means, to the calendars of the individuals who are on the list of attendees. The scheduler pools the requests and weighs the variables representing the requested meeting dates, times and locations and then schedules a meeting in view of the optimized variables (Step 306). The weighting of variables may be based on many different criteria including, but not limited to, a person's corporate title, location, past participation in meetings or lack thereof. Likewise, variables may be weighted according to the size of the meeting room, the availability of A/V, audio/visual equipment (e.g. stereo sound systems or projectors), the acoustical properties of the meeting room, or the cost of the meeting. Alternatively, virtual meetings over phone or computer networks may be scheduled without the need for a physical meeting location. It is also contemplated by the invention herein that weighting variables is dynamic and may change over time, and may be different for different meetings. Thus, for some meetings the proximity of the location may be the most important attribute, while for others the availability of a particular piece of equipment in a meeting room may be important. Additionally, many different weighting factors, like the ones previously discussed, may be stored in an electronic template which may be accessed and exchanged by network users or attendees when requesting or scheduling a meeting.

After the meeting is scheduled, the scheduler may continue to receive additional meeting requests from other attendees or updated meeting requests from current attendees which are then pooled with the previously submitted meeting requests (Step 308). The scheduler again optimizes the pooled requests and may dynamically reschedule previously arranged meetings. In the event no additional requests are submitted within the time frame allowed by the scheduler for pooling requests, the meeting date, time and location is confirmed by broadcasting a message to all attendees of the scheduled meeting (Step 310). The broadcasting or notification may be to meeting participants, a calendar (e.g. a calendar stored within a computing system including a system or systems which contain the calendars of the participants), or a third party providing services to facilitate the meeting. The participants for the meeting who have authorized automatic entry (into their calendars) may be scheduled automatically or sent invitations, but electronic invitations may be sent to other attendees or alternatively others are either sent requests for information about availability, or are sent a tentative invitation.

FIG. 4 is a flowchart depiction of the optimization architecture utilized by the method disclosed herein. Initially, the scheduler receives the pooled requests from persons desirous of scheduling a meeting (Step 402). The pooled requests are analyzed by the scheduler wherein selected variables such as meeting date, time and location are represented as variables (Step 404). The variables representing the requested variables of the meeting are compared and optimized by linear programming or other similar statistical algorithms which are well known in the art (Step 406).

Based on the results of the optimization process, the scheduler schedules the event or meeting to occur at the determined date, time and location (Step 408).

The optimization may be performed using any one of a number of nontrivial mathematical techniques including integer programming, linear programming, deterministic optimization, priority-based search heuristics, greedy algorithms, randomized algorithms, local search methods, metaheuristics, tabu search, evolutionary algorithms, genetic algorithms, simulated annealing, agent-based algorithms, portfolio optimization, simulation, stochastic optimization, forecasting analysis. These mathematical techniques may be used to calculate an optimization for two or more constraints.

The following discussion uses integer programming in order to optimize the embodiment set forth in FIG. 2.

Let $E = \{1, 2, \ldots, N\}$ be the set of the plurality of personnel (e.g., E could be all personnel in a company), and $P = \{1, 2, \ldots, p\}$ be the subset of E which include all potential participants for the event under consideration. For the sample problem, P={Joe Smith, Mary Jones, Fred Barnes, Larry Jacobs, People in Sales Dept, People reporting to Joe Smith}.

In the following description, the symbol U indicates the union of sets. The symbol ∈ means set membership.

For the formulation of the sample problem, it is helpful to decompose P into $P = \{\text{Joe Smith, Mary Jones}\} \cup P_1 \cup P_2 \cup P_3$, where $P_1$={Fred Barnes, Larry Jacobs}, $P_2$={People in Sales Dept}, and $P_3$={People reporting to Joe Smith}. The rationale for this decomposition will become clear later. We will use index p for participants.

In order to formulate the problem, we must first come up with a representation of a schedule which captures the availability of each participant. Let $D = \{1, 2, \ldots, 365\}$ be the set of days in a calendar year with d∈D representing the $d^{th}$ day of a year. For the purpose of formulating the sample request, d=1 means January 1, ..., d=62 means March 3, and d=69 means March 10, etc. We assume 9 working hours (from 8 AM to 5 PM), and the minimum meeting duration is 15 minutes (other cases can be modeled with little modification). Therefore, every day is divided into 36 (=4× 9) time slots. Let $T = \{1, 2, \ldots 36\}$ be the set of slots, where 1 means 8:00-8:15 AM, 2 means 8:15-8:30 AM, etc. Moreover, $T = M \cup A$ with $M = \{1, 2, \ldots, 16\}$ representing morning time slots and $A = \{17, 18, \ldots, 36\}$ the set of slots for afternoon. The variable t indexes time slots. The schedule for person p can thus be represented as a 365×36 2-dimensional 0-1 array in a schedule database, where:

$$p_{dt} = \begin{cases} 0, & \text{person } p \text{ is not available at time slot } t \text{ on the } d^{th} \text{ day} \\ 1, & \text{person } p \text{ is available at time slot } t \text{ on the } d^{th} \text{ day} \end{cases}$$

Therefore, scheduling for a person means finding some $p_{dt}$ that is 1 and changing it to 0, and deleting a schedule means changing the value of $p_{dt}$ from 0 to 1 in the database (so that the time slot t on the $d^{th}$ day is available for a new request).

Furthermore, let $L = \{1, 2 \ldots \text{lmax}\}$ be the set of all potential meeting locations. The availability of a location (indexed by 1) is also represented as a 365×36 0-1 array in a resource database, where:

$$l_{dt} = \begin{cases} 0, & \text{location } l \text{ is taken at time slot } t \text{ on the } d^{th} \text{ day} \\ 1, & \text{location } l \text{ is available at time slot } t \text{ on the } d^{th} \text{ day} \end{cases}$$

The availability of other resources (e.g., equipment, facilitators, etc.) for meeting can be represented similarly and stored in the resource availability database.

Inputs to the Model (Words in "()" are the Values for the Sample Request in FIG. 2)

1. From the request for meeting in FIG. 2:
   P={participants} ({Joe Smith, Mary Jones} $\cup P_1 \cup P_2 \cup P_3$, where $P_1$={Fred Barnes, Larry Jacobs}, $P_2$={People in Sales Dept}, and $P_3$={People reporting to Joe Smith}).
   ED=earliest date (March 3, i.e., d=62)
   LD=latest date (March 10, i.e., d=69)
   Ta=Target date (March 10, i.e., d=69)
   PT=Preferred time which is a subset of T (morning, i.e., PT=M)
   PL=Preferred location which is a subset of L (auditorium, i.e., PL={1})
   D=Duration of the meeting which is represented as the number of time slots (1 hour=4, i.e., 4 time slots of 15-minute length).

2. From the schedule database and resource availability database:
   $p_{dt}$ for every p∈P, d∈D, t∈T.
   $l_{dt}$ for every l∈L, d∈D, t∈T.
   and any other resources.

Decision Variables

The scheduling decision is to decide when and where the event should occur, and who among the potential participants should attend. Let $s_{pdtl}$, be a binary variable with:

$$S_{pdtl} = \begin{cases} 1, & \text{if person } p \text{ attends the event at location } l \text{ on time slot } t \text{ in the } d^{th} \text{ day} \\ 0, & \text{otherwise} \end{cases}$$

A schedule is completely specified by the value of $s_{pdtl}$. Therefore, the scheduling software or tool defines the optimal schedule by determining 0 or 1 to each $s_{pdtl}$.

Objective Functions

Any item in a meeting request can either be modeled as a constraint or be a term in the objective function. The objectives may include maximizing the number of attendees, minimizing travel time, minimizing wait time, maximizing contiguous meeting time, choosing a preferred meeting location, minimizing the variance from a preferred meeting time. Therefore, there are many possible formulations to any meeting request. To highlight the multiple-criteria feature of the problem, we choose two items of the request on FIG. 2 as objectives.

Objective I: Maximize the Attendance of the People who are Desirable or Optional for the Event, i.e., $$\text{Max } Z_1 = \sum_{p \in \{Mary\ Jones\} \cup P_3} S_{pdtl}$$

In other words, we wish to maximize the variable $Z_1$ which is the number of desirable and optional participants who can attend. This is expressed as the summation of the number of elements with value 1 in the decision variable s.

Objective II: Schedule the Event as Close as Possible to the Target Date, i.e., $$\text{Min } Z_2 = \left| \sum_{d \in D} d * S_{pdtl} - Ta \right|$$

Here the summation over d gives the exact day on which the meeting will occur; the variable $Z_2$ gives the closeness of the targeted day with the scheduled meeting day.

With more than one objective, the problem is a multi-objective optimization problem. There is a rich Operations Research literature dealing with solving this kind of problem. One possibility is to optimize the weighted average of all objectives with weights representing some business value/rules or decision making criteria. In this sample treatment, we assume this is the case and the objective is to:

Max $Z = \alpha * Z_1 + \beta * Z_2$

Where weights $\alpha$ and $\beta$ represent the relative importance of $Z_1$ and $Z_2$, whose values are determined by some business rules.

Constraints

The constraints may include such parameters as meeting duration, earliest date, latest date, mandatory attendees, participant availability, preferred time, preferred location, the meeting must occur by a specified time, last for a determined duration, must occur before a specified event, there is a requirement to schedule a recurring meeting, or that the scheduling request is not negotiable. The sample requests use the following constraints:

The mandatory attendance of Joe Smith, of a representative from Sales Dept, and of Fred Barnes or Larry Jacobs is translated into three groups of constraints:

$S_{pdtl} >= 1$, for p={Joe Smith} and all $d \in D$, $t \in T$, $l \in L$ $$\sum_{p \in P_1} S_{pdtl} >= 1, \text{ for all } d \in D, t \in T, l \in L$$

$$\sum_{p \in P_2} S_{pdtl} >= 1, \text{ for all } d \in D, t \in T, l \in L$$

By forcing $S_{pdtl} >= 1$ for p=Joe Smith, we ensure that Joe must attend the meeting. Similarly, the other two inequalities ensure at least one representative from Sales Dept, and Fred Barnes or Larry Jacobs to attend the meeting.

Earliest-date and latest-date constraints:

$$62 \leq \sum_{d \in D} d * s_{pdtl} \leq 69 \text{ for all } p \in P, t \in T, l \in L$$

The above summary gives the date on which the meeting occurs. And the inequalities ensure that meeting will occur between 62th day (March 3) and 69th day (March 10). Please note that target date is translated into a term in the objective function of Z, thus there is no constraint for "target date" in this formulation.

Preferred-Time Constraints:

$$\sum_{t \in elem\ M} S_{pdtl} \geq \sum_{t \in A} S_{pdtl} \text{ for all } p \in P, d \in D, l \in L$$

Since the sum over morning time slots is not less than the sum over afternoon slots, the above inequality gives preferred time (for the meeting) to morning time.

Preferred-Location Constraints: (backslash notation means L excluding the auditorium)

$S_{pdt\{auditorium\}} \geq S_{pdtl}$ for all $p \in P$, $d \in D$, $t \in T$, $l \in L \setminus \{auditorium\}$ This constraint assigns preferred location to auditorium over any other locations.

Duration Constraints:

$$\sum_{t \in T} s_{pdtl} = 4 \text{ for all } p \in P, d \in D, l \in L$$

The sum at the left-hand side represents the number of time slots for the meeting. By equaling it to 4, this specifies 1 hour meeting duration (four 15-minute time slots).

Participants-Availability Constraints:

$S_{pdtl} \leq P_{dt}$ for all $p \in P$, $d \in D$, $t \in T$, $l \in L$

A participant can only attend a meeting when she is available (i.e., $p_{dt} = 1$). This constraint ensures that the meeting will occur at the free time of every participant.

Resource-Availability Constraints:

$S_{pdtl} \leq l_{dt}$ for all $p \in P$, $d \in D$, $t \in T$, $l \in L$

Similarly, this constraint ensures that a location can be used (for this particular meeting) only when it is available (i.e., $l_{dt} = 1$).

FIG. 5 sets forth an alternative embodiment of the method of optimizing pooled meeting requests as discussed herein. Initially, multiple requests for a meeting are accepted and pooled by the scheduler (Step 502). Next, meeting variables or constraints such as maximum or minimum meeting attendance, maximum or minimum travel times, closest or "nearest in" meeting dates are collected and formulated into a problem statement (Step 504).

The scheduling optimization may include allowing for travel time of a participant of the meeting, between a previously or next scheduled location and the selected meeting place. It is also possible to provide for scheduling public meetings with no specific list of committed or required attendees, but where a list of likely attendees provides a list of calendars whose previously scheduled events are to be avoided in scheduling a meeting. The scheduling optimization may also take into account public meetings for which some or all of the attendees may have a likely interest in attending even though no specific commitment to attend them exists. Other considerations may include the scheduling of meetings for which subsequent meetings for at least one participant are not rescheduled within a defined number of hours before they are scheduled to begin; for which the elapsed time between the placing of a request and the assignment of a meeting time or place is specified in the scheduling request; for which the time or the date by which meeting schedule must be assigned is specified in the request; for which reservations may be made for meeting location rooms such that the room is reserved for use by a particular person or persons until a determined number of hours before the scheduled meeting time, at which point it becomes available for assignment to anyone; for which the description of the desired meeting includes the most desirable location, required equipment for the room, a preferred time, or a preferred date; for which the scheduling request is for two or more meetings at different locations to be scheduled via telephone or video conference with appropriate room reservations and time zone information included; for which the submission of a request is made via e-mail, instant message or other means to each participant of the meeting prior to the attempt to schedule the meeting or event.

Using standard mathematical and analytical techniques which are well known in the art, such as linear or integer programming, an optimal solution is determined given the meeting constraints involved in the problem statement (Step 506). As alternatives to analytical determination of the optimized solution, techniques such as auctions or incentives may determine the solution for scheduling the meeting. For instance, a meeting requestor may bid for a certain location against other entities or persons requesting meetings in a particular location. Alternatively, if a meeting is scheduled, then canceled which results in the nonuse of the location, a meeting requester may incur a "penalty" for failing to remove the reservation or "hold" on the location so that others might use the location. If the solution is feasible and each meeting requestor and attendee is capable of attending the scheduled meeting, a message is broadcast to each meeting requestor and attendee indicating that a meeting has been scheduled. Likewise, each participant's calendar is then updated as authorized to indicate that the requested meeting has been scheduled between the requester and attendees (Step 508). However, if the optimal solution of the problem statement does not result in a feasible solution, one or more of the meeting variables or constraints is then removed from the problem statement and another analysis is performed until a feasible solution results (Step 510). Further, the order of processing requests within a "batch" may be chosen in a particular way, namely that requests for "near-in" meetings are processed before "further out" meetings, and meetings with more participants are processed before those with fewer. The meetings to be scheduled in a particular batch may have a priority order chosen by one of assigned priority, highest title or management level attendee, number of attendees, presence or absence of an agenda, or high priority meetings are scheduled in preference to low priority meetings. In addition in the process, the attendees may have weighting factors so that the system can determine who is most important in the scheduling optimization process; the meeting locations may have weighting factors so that the system can determine which locations are most important in the scheduling optimization process. The weighting factors may be stored in templates.

Also, it may be decided that meeting times and places are optimized by auction; that scheduling a meeting and then not using the meeting room incurs a penalty, particularly if the meeting is canceled and the room reservation "hold" is removed; that the penalty is one of: monetary payment or diminished use of services. Additional considerations may include that the meeting is either a physical meeting or a virtual meeting, e.g. by remote means such as by phone. Also, the participants for the meeting may be people (humans), electronic agents, or groups of people.

In view of the disclosure set forth above, it is further noted that the optimization procedure involves attempting to schedule a meeting request with the constraints initially required by the client. If a meeting cannot be scheduled within the original constraint(s), then the method provides for the reformulation of the optimization problem based on a meeting request where some of the changeable commitments on the calendar of some of the participants are either assumed to be removed or are actually removed and the optimization is performed again. For example, if a meeting may only be scheduled after the removal of several constraints, the method disclosed herein may contemplate a secondary schedule optimization for scheduling the "removed" constraint(s), thereby minimizing the total disruption to the attendees whose calendars are changed. This process may be repeated with different subsets of attendees or groups providing the "removed" events.

Although availability, for example of meeting attendees or audio/visual equipment, has been discussed in terms of a binary "yes/no" context, it is also possible for such availability probabilistic, e.g. to be given in terms of probabilities. For example, a potential meeting attendee may indicate he or she is 70 percent likely to be available for a meeting. A computer projection unit may be 90 percent likely to be available.

Also, weather conditions and forecasts or traffic conditions and forecasts may be used in the calculations. The traffic pattern for the attendees route to the meeting may have an 80 percent likelihood for congestion. There may be a 10 percent chance inclement weather, e.g. snow or rain. These probabilities may be used to optimize meeting locations, attendees, and times. The system will also allow potential attendees to specify these various probabilities; for example, a person may indicate, using a graphical user interface element (e.g. slider, button, text), that he or she is "likely" to be available or is 80 percent likely to be available. Other criteria for meetings may also be considered during optimization. These criteria include: minimizing the fees charged for the meeting room and associated services (such as food services and writing supplies), features associated with room ambiance (e.g. lighting, window with a view, comfortable seating), and the availability of support staff (e.g. people to assist with audio/visual needs). Various characteristics of the meeting attendees may also be optimized. For example, it may be useful, necessary, or lawful to have a diverse population in the room in terms of salaries, ethnicity, age, and gender. It may also be useful to have attendees with a set of certain skills (e.g. computer programming, medical, or secretarial). These and other features may be considered during the optimization process.

It is important to note that while the present invention has been described in the context of a fully functioning data processing system, those of ordinary skill in the art will appreciate that the processes of the present invention are capable of being distributed in the form of a computer readable medium of instructions and a variety of forms and that the present invention applies equally regardless of the particular type of signal bearing media actually used to carry out the distribution. Examples of computer readable media include recordable-type media, such as a floppy disk, a hard disk drive, a RAM, CD-ROMs, DVD-ROMs, and transmission-type media, such as digital and analog communications links, wired or wireless communications links using transmission forms, such as, for example, radio frequency and light wave transmissions. The computer readable media may take the form of coded formats that are decoded for actual use in a particular data processing system.

The description of the present invention has been presented for purposes of illustration and description, and is not intended to be exhaustive or limited to the invention in the form disclosed. Many modifications and variations will be apparent to those of ordinary skill in the art. The embodiment was chosen and described in order to best explain the principles of the invention, the practical application, and to enable others of ordinary skill in the art to understand the invention for various embodiments with various modifications as are suited to the particular use contemplated.

What is claimed is:

1. A computer-implemented method of event scheduling for a plurality of attendees, the method comprising:
   receiving at least one request for scheduling a calendar meeting;
   receiving at least two meeting constraints;
   using an optimization means to schedule the calendar meeting to satisfy the at least two meeting constraints, and to maximize an attending number of the plurality of attendees able to attend the calendar meeting;
      wherein using said optimization means comprises using at least one of integer programming, linear programming, deterministic optimization, priority-based search heuristics, greedy algorithms, randomized algorithms, local search methods, meta-heuristics, table search, evolutionary algorithms, genetic algorithms, simulated annealing, agent-based algorithms, portfolio optimization, simulation, stochastic optimization, forecasting analysis;
      wherein at least one of the at least two meeting constraints is selected from the group consisting of participants of said meeting, desired meeting locations, meeting topics, time of the meeting, weather conditions, weather forecasts, traffic conditions, traffic forecasts, availability of audio/visual equipment, and cost of the meeting;
   meeting at least one objective, wherein the at least one objective comprises at least one of minimizing a travel time, minimizing a wait time, maximizing a contiguous meeting time, choosing a preferred meeting location, minimizing a variance from a preferred meeting time, maximizing an attendance of a first ones of the plurality of attendees who are desirable or optional for the calendar event, scheduling the calendar event as close as possible to a target date, maximizing an availability of audio/visual equipment, and minimizing a likelihood of inclement weather;
   notifying at least one entity, wherein said entity is selected from the group consisting of at least one of the plurality of attendees, a calendar, and a third party providing services to facilitate the calendar meeting;
      wherein at least one of the at least two meeting constraints is selected from the group consisting of a meeting duration, an earliest date, a latest date, mandatory attendees, a participant availability, a preferred time, and a preferred location;
      wherein the at least two meeting constraints include variable constraints, whereby the calendar meeting must occur by a specified time, last for a determined duration, or must occur before a specified event;
      wherein the optimization means is performed immediately upon entry of the at least one request;
      wherein the at least one request comprises at least two requests, the at least two requests being batched and periodically processed together;
      wherein the at least two meeting constraints include an indicator that the at least one request is not negotiable;
      wherein the optimization means includes allowing for a travel time of at least one of the plurality of attendees between a previously or next scheduled location and a selected meeting place of the calendar meeting;
      wherein an elapsed time between the receiving of the at least one request and the scheduling of a meeting time or a meeting place for the calendar meeting is specified in the at least one request;
      wherein one of a time and a date by which the calendar meeting must be scheduled is specified in the at least one request;
      wherein a reservation may be made for a meeting location room such that the meeting location room is reserved for use by a particular person until a determined number of hours before a scheduled meeting time for the calendar meeting, at which point the meeting location room becomes available for assignment to at least one other person;
      wherein a description of the calendar meeting includes at least one of a most desirable location, a required equipment list, a preferred time, and a preferred date;
      wherein the at least one request further comprises at least two requests for scheduling two or more meetings at different locations to be conducted via a telephone conference or a video conference, the at least two requests including at least one appropriate room reservation and at least one appropriate time zone information;
   forwarding the at least one request to the plurality of attendees via e-mail or instant message;
      wherein the at least one request comprises a first request and a second request, the first request and the second request having a relative priority order in relation to each other, wherein either the first request or the second request is given a scheduling preference based on the relative priority order;
      wherein each of the plurality of attendees have weighting factors wherein the optimization means utilizes the weighting factors in scheduling the calendar meeting;
      wherein the desired meeting locations have weighting factors wherein the optimization means utilizes the weighting factors in scheduling the calendar meeting;
      wherein the weighting factors are stored in templates;
      wherein the time of the meeting and the desired meeting locations are optimized by auction;
   incurring a penalty when the calendar meeting is canceled, a room reservation "hold" for a meeting room is removed, and the meeting room is not used, wherein the penalty is a monetary payment penalty or a diminished use of services penalty;

automatically scheduling first ones of the plurality of attendees, the first ones having authorized automatic entry into a corresponding one of a plurality of calendars; and sending an electronic invitation to second ones of the plurality of attendees;

wherein the electronic invitation comprises either a tentative invitation or a request for information about availability;

wherein the at least two meeting constraints are probabilistic; and satisfying combined objective comprising, at least in part, a first objective and a second objective, wherein the first objective is to maximize the attendance of the people who are desirable for the event according to the formula, $$\text{Max } Z_1 = \sum_{p \in \{Person\ 1\} \cup P_3} s_{pdtl}$$

and wherein the second objective comprises scheduling the event as close as possible to the target date according to the formula, $$\text{Min } Z_2 = \left| \sum_{d \in D} d * s_{pdtl} - Ta \right|$$

and wherein satisfying the combined objective comprises satisfying the formula $$\text{Max } Z = á*Z_1 + á*Z_2.$$

* * * * *